Oct. 9, 1934.  V. L. SCOTT  1,976,637
BALL BEARING STRUCTURE
Filed June 16, 1930
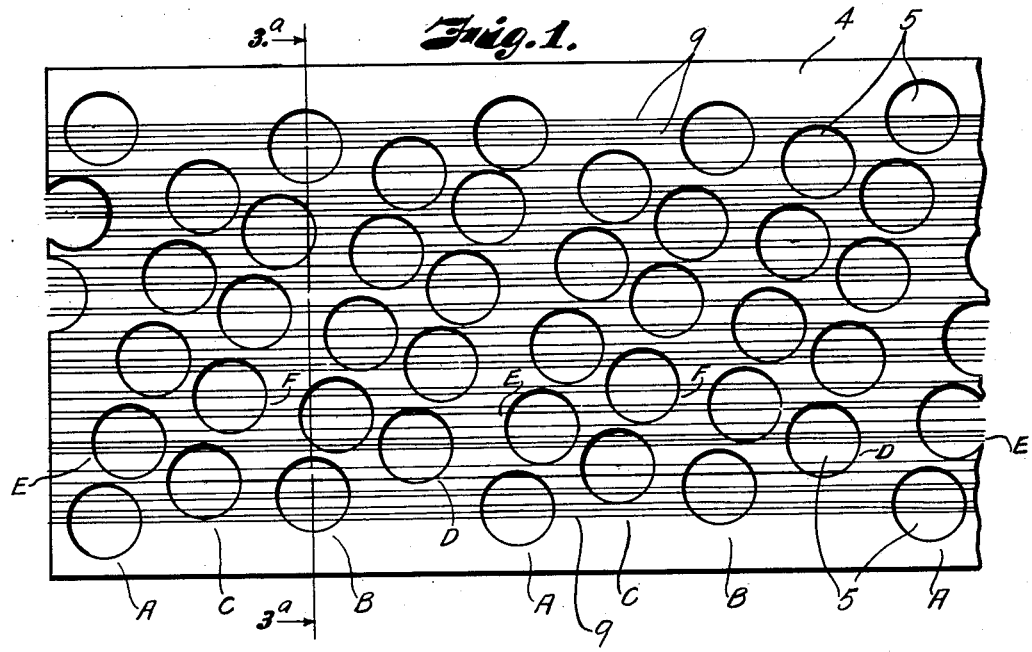
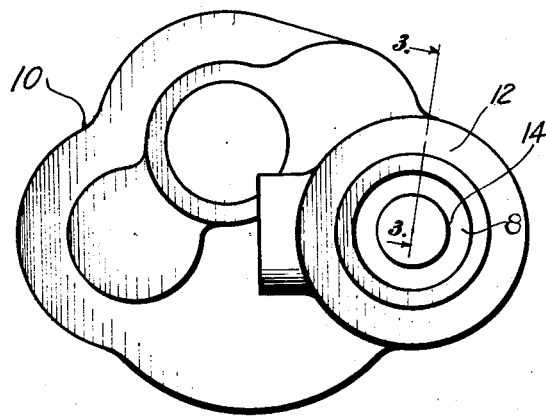
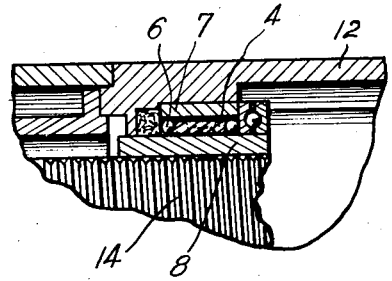
INVENTOR:
Victor L. Scott,
BY: Chas. W. Gerard
ATTORNEY Patented Oct. 9, 1934

1,976,637

UNITED STATES PATENT OFFICE 1,976,637

BALL BEARING STRUCTURE

Victor L. Scott, Ottumwa, Iowa

Application June 16, 1930, Serial No. 461,508

5 Claims. (Cl. 308—201)

The present invention has relation to ball bearing construction, and the primary object in view is to provide an improved type of ball bearing structure in which the arrangement and distribution of the ball elements is such as to divide the load as evenly and uniformly as possible over a considerable number of such elements, and without any appreciable deformation of any of the ball elements or either of the bearing surfaces engaged thereby.

Accordingly, one of the features of the present invention consists in providing a ball bearing structure made up of a plurality of series of ball bearings, and arranged in such a way that no two of the ball bearings of the entire construction are allowed to travel in the same path about the axis of the bearing.

A further object of the invention is to devise a bearing structure of this type in which direct provision is made to allow for a certain degree of compensation for irregularities in the bearing elements, with a view to permitting the bearing assembly, in the "breaking in" operation, during the initial period of service of the bearing, to assume a permanent relation of the various elements in which the ball bearing surfaces receive a more nearly even distribution of the load, and without any injurious distortion or deformation of the bearing elements during this breaking in period of the bearing.

In carrying out this feature of the invention, I make use of inner and outer bearing members or bushings of slightly different relative density, whereby the ball bearings are permitted to produce their own tracks or grooves as they wear and seat themselves in the relatively softer bearing surface, at the same time producing a cold hardening action along the surface thus tracked, in the wearing-in process.

It is further sought, as a part of my invention, to devise an improved construction process, for the production of ball bearings possessing my improved features, including the method of drilling the ball retainer member, in order that no two balls of the same bearing shall travel in the same path around the axis of the bearing, and also my method of providing for a bearing which will be more nearly correct and accurate in its operation, in distributing the load, by designing the bearing assembly for an initial compensating action to allow the ball elements to seat themselves in one of the bearing surfaces, as above referred to.

With the foregoing general object in view, the invention will now be described by reference to the accompanying drawing illustrating one form of bearing construction which I have devised for embodying the proposed improvements, after which the various features and combinations of the same deemed to be novel will be particularly set forth and claimed.

In the drawing—

Figure 1 is a plan view illustrating a portion of a ball retainer member drilled with openings in accordance with the practice of the present invention;

Figure 2 is an exterior view (partly broken away) of a drilling machine of the type for which the present bearing structure is particularly adapted; and Figure 3 is an enlarged sectional detail, representing a section taken on the line 3—3 of Figure 2, and also representing a cross-section of the ball retainer member as indicated by the line 3a—3a of Figure 1.

Referring now to the drawing in detail, in the practice of my invention I prepare the ball retaining member by drilling a steel sheet 4 of appropriate size with a plurality of ball retaining openings 5 of the same exterior diameter as the balls 6 which are to be used in the bearing. These openings or holes are drilled by the so-called index method, with the object of so arranging the holes that when the entire set has been drilled no two of them will be in the same alinement longitudinally of the sheet 4. Accordingly, the drilling of the first set of holes 5, indicated at A, is started as near to one side margin of the sheet 4 as is practicable, but with each succeeding hole located progressively nearer to the opposite side of the sheet. The second set of holes indicated at B, is started farther over on the sheet, being drilled intermediate the holes of the set A and likewise has each succeeding hole drilled progressively nearer to the opposite side; and so on with each succeeding series, as indicated at C, D, E, F, etc., the arrangement or pattern and number of the openings being adapted, of course, to the diameter and width of the particular bearing involved, but always with the same final result in view, to produce a non-spiral relation of the bearing openings so that no two of the openings 5 shall be in the same longitudinal alinement, and also an irregularly staggered relation of the openings with the result that preferably not more than two of them, in the construction illustrated, will fall in the same transverse alinement, after all the openings have been drilled.

For the bearing sleeves or bushings, a fixed outer bearing member 7 is chosen whose bearing surface is of a permanently glass-hardened character, while the bearing surface of the inner journal bearing sleeve 8 is of a relatively softer density, for permitting the necessary compensation for the irregularity in the size and hardness of the balls themselves. Hence, in the initial service of the bearing structure, as it is "broken in", the balls 6 will seat themselves, producing their own separate and individual tracks or channels in the surface of the inner journal bearing member 8, as indicated by the reference numeral 9 in Figure 1, and therefore in the final bearing there will be as many separate tracks or channels 9 as the total number of balls 6 in the complete bearing assembly, the remaining tracks coming intermediate the lines 9 represented on the drawing.

While in theory, ball bearing structures are constructed to evenly distribute the load about the bearing, it is of course impossible to produce absolutely invariable bearing elements, as balls of the most accurate manufacture will always vary slightly, in size, shape, density, etc. When placed in service, the balls and bearing surfaces in engagement therewith will undergo momentary deformation at each passage of the load. For each difference or irregularity in the bearing elements, there will of course be a corresponding strain upon the elements to which the greater stress is applied, and where the balls vary in size, there will always be a greater strain imposed on the larger sized ball. In designing the bearing, it is essential that the size and extent of the bearing shall be such that any deformation occurring shall not be beyond the capacity of the balls and bearing surfaces to withstand, otherwise the life of the bearing will be extremely short. A certain safety factor is always figured, to compensate for any inaccuracies in material and workmanship, so that the bearing is constructed with a safe margin of load carrying capacity, that is, greater than the theoretical capacity of the bearing.

It is apparent that the more nearly it is possible to approximate a perfectly even distribution of the load throughout the series of the ball bearings used, the necessity for the safety factor disappears, the wear in the bearing is reduced to a practical minimum, and the life of the bearing indefinitely prolonged. Since it is impossible to provide ball bearings of absolutely uniform size, it becomes evident that there must be some compensation for this difference in the manufacture, if there is to be any practical uniformity in the operation of the bearing structure. I have therefore conceived the idea of making the initial period of service of the bearing bring about the necessary compensation for the differences in the bearing elements; that is, the breaking-in of the bearing is thereby caused to wear in the various parts of the bearing in such a way as to eliminate the irregularities referred to.

This is provided for in the improved bearing by making the inner or journal bearing member 8 of relatively softer density, in order that any excess pressure applied to the several ball bearings 6 will cause these to wear in or seat themselves in the surface of the bearing member 8. As a consequence, the deformation made necessary by the irregularities and resultant excess load upon the corresponding bearing elements is caused to take place in the inner bearing member 8, and in such a way that the balls, without change in themselves, manufacture their own raceways or bearing grooves in the surface of the bearing member 8. This is one vital improved feature of my invention.

The other vital feature of the improvement in the present invention is a definite predetermined arrangement of the several series of ball bearings in such a way that they are maintained by the ball retaining member 4 in a constant permanent relation wherein no two balls of the series will follow the same circular path about the axis of the bearing, as will be evident from an examination of Figure 1. Therefore, each ball bearing 6 produces its own individual raceway or bearing groove in the member 8, and thereafter tracks in this separate individual groove throughout the remaining period of operation of the bearing. The density of the inner bearing member 8 is not required to be greatly less than that of the outer fixed bearing 7, in order to compensate for the irregularities in the balls 6 and permit these to seat themselves the necessary extent, without any damage to either the balls or the surface of the outer bearing member 8; besides which, the continued cold rolling action of the balls 6 along their respective individual paths over the surface of the bearing member 8 will produce the necessary hardening action to bring this bearing surface along the paths of the balls 6 to approximately the same hardness as that of the balls themselves.

By means of a bearing design and assembly of this character, it is apparent that the load may be distributed over such a multiplicity of balls that the load on any one of them will be extremely small, and with each ball traveling in its own individual raceway the wear taking place in the bearing is kept so small as to be almost negligble, thereby giving the bearing structure almost unlimited wearing qualities.

The distribution of the load may be thus spread evenly over a bearing of so great an extent as makes possible the use of ball bearings of so small a diameter as to render the improved construction especially desirable and useful in apparatus where the severe load conditions demand a heavy duty bearing, and at the same time limit the size of the bearing as regards the radius between the operating member or shaft and the exterior of the bearing. This is especially true in coal drilling apparatus of the type shown in Figure 2, illustrating the gear and motor case 10 at one side of which is mounted the housing portion 12 through which operates the drill bar 14 for which a suitable type of ball bearing structure must be provided. When it is considered that many of the positions in which a drilling machine of this character must be operated require that the drill bar must be maintained almost directly flush with the face of a wall, floor or ceiling, affording a minimum of clearance between such working face and the axis of the drill bar, the necessity of providing a bearing structure small enough to be accommodated within such space and at the same time affording the requisite load carrying capacity is clearly demonstrated. It is however evident that the characteristics of the improved bearing construction fulfill all these requirements, and will offer a practical and efficient construction of unique design as regards those outstanding properties above emphasized, that of automatically producing separate and individual bearing grooves for each and every ball and compensating for the intrinsic differences and peculiarities of the same, thereby making possible a bearing structure of maximum accuracy and longlived service.

While I have illustrated and described what I now regard as constituting the preferred form of construction as well as method of practicing my invention, I desire to reserve the right to make all such changes or modifications as may fairly fall within the scope of the appended claims.

What I claim is:

1. A ball bearing structure comprising spaced inner and outer bearing members having opposed bearing surfaces, ball bearings interposed between said members for engagement with said surfaces, one of said bearing surfaces being initially of relatively softer density for accommodating irregularities in said ball bearings, and ball-retaining means arranged to maintain the ball bearings in irregularly staggered and non-spiral relation with no two of them the same circumferential alinement.

2. A ball bearing structure comprising spaced inner and outer bearing members having opposed bearing surfaces, ball bearings interposed between said members for engagement with said surfaces, and a ball retainer member acting to maintain said ball bearings in spaced relation both transversely and circumferentially of the bearing structure and also in groups staggered irregularly crosswise of the bearing structure, but with no two of the ball bearings in the same circumferential alinement.

3. A ball bearing structure comprising, a cylindrical ball retainer, and a plurality of ball bearings maintained by said member in non-spiral relation with no two of the ball bearings in the same circumferential alinement, and also in relatively and irregularly staggered positions for preventing progressive impelling of the lubricant in the direction of either end of the bearing structure.

4. A ball bearing construction comprising, a plurality of ball bearings, and a cylindrical ball retainer member provided with ball retaining means engaging and holding the balls in relatively and irregularly staggered positions cooperating to prevent progressive impelling of the lubricant in the direction of either end of the bearing construction.

5. A ball bearing construction comprising, a plurality of ball bearings, and a cylindrical ball retainer member provided with separate ball engaging and retaining means arranged in staggered and non-spiral relation for holding the balls in relative positions cooperating to prevent progressive impelling of the lubricant in the direction of either end of the bearing construction.

VICTOR L. SCOTT.